(No Model.)

J. Q. DAY.
SCREW DRIVER.

No. 454,929. Patented June 30, 1891.

WITNESSES:
Donn Twitchell
E. M. Clark

INVENTOR:
J. Q. Day
BY
Munn & Co
ATTORNEYS

UNITED STATES PATENT OFFICE.

JOHN Q. DAY, OF RED CLIFF, COLORADO.

SCREW-DRIVER.

SPECIFICATION forming part of Letters Patent No. 454,929, dated June 30, 1891.

Application filed July 21, 1890. Serial No. 359,350. (No model.)

*To all whom it may concern:*

Be it known that I, JOHN Q. DAY, of Red Cliff, in the county of Eagle and State of Colorado, have invented a new and Improved Screw-Driver, of which the following is a full, clear, and exact description.

The object of the invention is to provide a new and improved screw-driver, which is actuated by simply pressing the handle when the screw-head is engaged, and which is arranged to turn the shank in either direction for driving in or unscrewing screws.

The invention consists in certain parts and details and combinations of the same, as will be described hereinafter, and then pointed out in the claims.

Reference is to be had to the accompanying drawings, forming a part of this specification, in which similar letters of reference indicate corresponding parts in all the figures.

Figure 2:
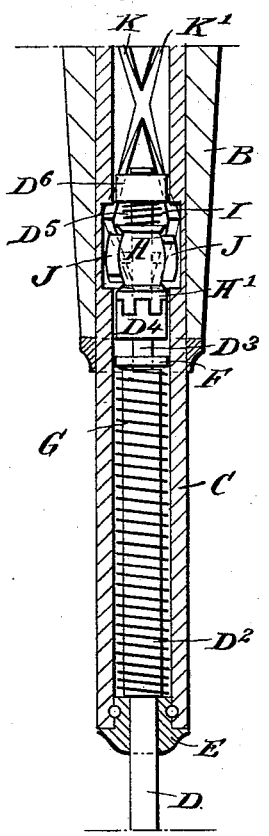
Figure 1:
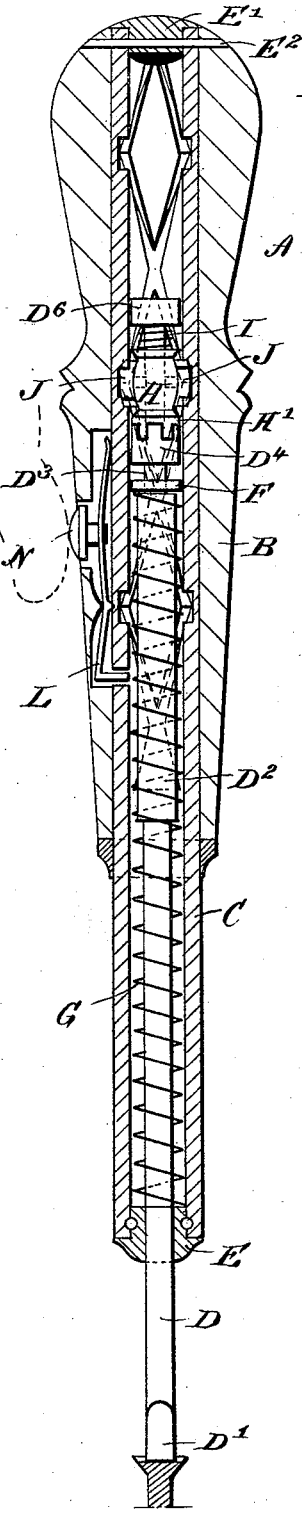
Figure 6:
Figure 3:
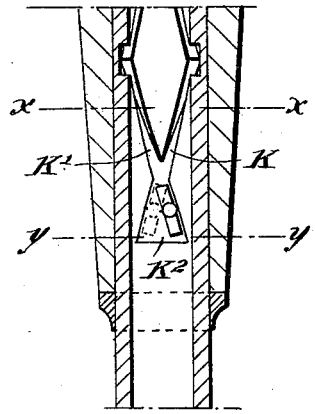
Figure 4:
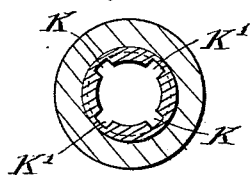
Figure 5:
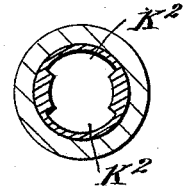

Figure 1 is a sectional side elevation of the improvement. Fig. 2 is a like view of part of the same in a different position. Fig. 3 is a sectional side elevation of part of the handle. Fig. 4 is a sectional plan view of the same on the line $xx$ of Fig. 3. Fig. 5 is a like view of the same on the line $yy$ of Fig. 3, and Fig. 6 is a view of one of the pivoted blocks for turning the shank.

The improved screw-driver A is provided with a suitably-shaped handle B, carrying a tube C, in which is mounted to slide and to turn the shank D, provided on its outer end with the flattened edge D', adapted to engage in the usual manner the slot in the head of the screw to be operated on. In the lower end of the tube C is secured a bushing E, through which passes the shank D, and which forms a bearing for the latter. A cap E' is secured on the other end of the said tube, and the latter is fastened to the handle B by a pin $E^2$ or other suitable means. On the shank D is formed the enlarged part $D^2$, from which extends the reduced part $D^3$, on which is mounted to turn loosely a collar F, on which is secured one end of a spring G, coiled around the part $D^2$ and part of the stem D, the lower end of the said spring resting on the collar E, as is plainly shown in Figs. 1 and 2. From the reduced part $D^3$ extends a clutch $D^4$, adapted to be engaged by a clutch H', formed on a sleeve H, mounted to turn and to slide on the reduced stem $D^5$, extending from the clutch $D^4$. On the outer end of the reduced end $D^5$ is secured a collar $D^6$, against which rests one end of a spring I, pressing with its other end on the sleeve H, so as to hold the clutch H' of the latter in contact with the clutch $D^4$ of the shank D. It is understood that the enlarged part $D^2$, the reduced parts $D^3$ and $D^5$, as well as the clutch $D^4$, and the collar $D^6$, are all in line with the shank D inside of the tube C. On the sleeve H are arranged opposite each other two blocks J, each provided with a pin J', mounted to turn in the sleeve H, so that the block J can swing to the right or left, as hereinafter more fully described. The two blocks J are adapted to engage grooves K or K', arranged spirally and formed on the inside of the tube C, the two grooves K being placed opposite each other. In a similar manner the grooves K' are arranged, so that the two blocks J engage either the two grooves K or the other grooves K'. A groove K and a groove K' terminate in the space $K^2$, formed on the lower end of the respective grooves, as is plainly shown in Fig. 3, the space being triangular in shape and serving to turn or change the position of the blocks J, so as to turn the shank D in either direction.

In the handle B is arranged a spring-lever L, the inbent end of which can extend behind the shank D in order to lock the shank in an outermost position when it is desired to use the screw-driver the same as an ordinary screw-driver. The lever is provided with a button N, extending to the outside of the handle and adapted to be pressed upon by a finger of the operator, as shown in Fig. 1, to unlock the shank D when it is desired to use the device, as hereinafter described.

The operation is as follows: The spring G has the tendency to hold the shank D in an outermost position, as illustrated in Fig. 2. When the operator now desires to drive a screw, he takes hold of the handle B, places the flattened end D' in the groove of the screw-head, and presses on the button N. He then presses the handle B in line with the shank D, so that the tube C slides over the shank D. The spring G is extended, and the blocks J, on account of engaging one of the sets of grooves K or K', turn the sleeve H, and the latter, by being connected by the clutches H' and D⁴ with the shank D, turns the latter, so that the screw is driven in. When this has been accomplished, the operator releases the pressure on the handle B, so that the spring G pulls on the collar F, abutting against the enlarged part D² of the shank, so that the handle B is forced outward, and at the same time the clutches D⁴ and H' are disengaged, whereby the shank D remains stationary, while the sleeve H is turned by its blocks J in the spiral grooves K or K' until the handle B has arrived at its outermost position by the force of the spring G. The spring I then again presses on the sleeve H and forces the latter, with its clutch H', into contact again with the clutch D⁴. The above-described operation can then be repeated either for another screw, or in case the screw originally operated on had not been thoroughly driven in. When it is desired to unscrew the screw, the operator holds the outer part of the shank D and slightly turns the holder B, so that the positions of the blocks J are changed in the space K², whereby the said blocks pass into the other grooves K or K', when the handle B is pressed and the shank D is rotated in an opposite direction.

When it is desired to use the screw-driver like the ordinary screw-driver now in use, the button N is not pressed. Then the spring-lever L engages at its inner end with the top of the collar D⁶, so that the tube C, secured on the handle D, cannot be pressed over the shank D, as previously described, on account of the lever L locking the shank D in place.

It is understood that the spring G does not revolve when the shank D is moved, as the inner end of the spring G is fastened on the collar F, held loosely on the reduced part D³ of the shank D. Thus it will be seen that by pressing the handle B the shank D is revolved, so as to screw up a screw or to unscrew it, in case the position of the blocks J is reversed in the manner above described.

Having thus described my invention, what I claim as new, and desire to secure by Letters Patent, is—

1. In a screw-driver, the combination, with a handle supporting a tube having two sets of spiral grooves, of a shank extending into the said tube and provided with a clutch, a sleeve having a clutch and mounted to turn loosely on the said shank, the said clutch being adapted to engage the shank-clutch, blocks pivoted on the said sleeve and adapted to engage one set of spiral grooves at a time, and a spring coiled on the said shank and pressing with one end on the latter and with its other end on the said tube, substantially as shown and described.

2. In a screw-driver, the combination, with a handle supporting a tube having two sets of spiral grooves, of a shank extending into the said tube and provided with a clutch, a sleeve having a clutch and mounted to turn loosely on the said shank, the said clutch being adapted to engage the shank-clutch, blocks pivoted on the said sleeve and adapted to engage one set of spiral grooves at a time, a spring coiled on the said shank and pressing with one end on the latter and with its other end on the said tube, and a spring pressing on the said sleeve to hold the clutch on the latter in contact with the said shank-clutch, substantially as shown and described.

JOHN Q. DAY.

Witnesses:
JNO. L. CAMPBELL,
L. S. PIERCE.